United States Patent [19]

Wehber

[11] Patent Number: 5,076,150

[45] Date of Patent: Dec. 31, 1991

[54] PISTON ASSEMBLY WITH WEAR RESISTANT PISTON RING LANDS

[75] Inventor: Wayne F. Wehber, Horseheads, N.Y.

[73] Assignee: Dresser-Rand Company, Corning, N.Y.

[21] Appl. No.: 717,161

[22] Filed: Jun. 13, 1991

Related U.S. Application Data

[63] Continuation of Ser. No. 519,536, May 4, 1990, abandoned.

[51] Int. Cl.⁵ ............................................. F16J 9/00
[52] U.S. Cl. .................................... 92/248; 92/255; 92/257; 92/258; 277/123; 277/125; 277/188 R; 277/DIG. 6; 277/102; 277/75
[58] Field of Search ............... 92/165, 175, 192, 193, 92/194, 201, 240, 248, 257, 259, 255, 258; 277/123, 125, 35, DIG. 6, 102, 75, 188 R; 417/571

[56] References Cited

U.S. PATENT DOCUMENTS

| | | | |
|---|---|---|---|
| 696,675 | 4/1902 | Heston | 92/193 |
| 1,974,362 | 9/1934 | Marsh | 92/194 |
| 2,295,521 | 9/1942 | Payne et al. | 277/188 R |
| 3,277,797 | 10/1966 | Tyree, Jr. et al. | 92/194 |
| 3,303,757 | 2/1967 | Ward | 92/201 |
| 3,549,155 | 12/1970 | Ward | 92/201 |
| 3,656,414 | 4/1972 | Muller | 92/193 |
| 4,048,909 | 9/1977 | Jepsen | 92/194 |
| 4,129,308 | 12/1978 | Hutchison | 277/188 R |
| 4,270,762 | 6/1981 | Johnston | 277/102 |
| 4,556,223 | 12/1985 | VanLoon et al. | 277/125 |
| 4,751,871 | 6/1988 | Burghardt et al. | |
| 4,833,977 | 5/1989 | Haahtela et al. | |
| 4,890,542 | 1/1990 | Miller et al. | 92/194 |

FOREIGN PATENT DOCUMENTS 1190792  4/1965  Fed. Rep. of Germany ........ 92/194

Primary Examiner—Edward K. Look
Assistant Examiner—Thomas Denion
Attorney, Agent, or Firm—Bernard J. Murphy

[57] ABSTRACT

The Assembly comprises a piston body having a longitudinal axis to which are added, in interlayered fashion, separate, piston-ring lands and spacers. In one embodiment, a pair of rider rings are coupled to the piston body, in spaced apart locations, to guide the piston assembly in reciprocation, and to space the piston-ring lands away from the surface of an enclosing cylinder. The lands have a diameter which is slightly less than that of the rider rings. The lands are formed of ceramic to offer, thereby, a substantially wear-resistant surface to the piston rings which are set between pairs of the lands, and about the spacers. The body is centrally bored and tapped, and the lands and spacers are centrally apertured; a headed bolt has the shank thereof in penetration of the lands, spacers and rider rings, and threadedly engaged with the tapped bore, to secure the assembly together.

10 Claims, 1 Drawing Sheet

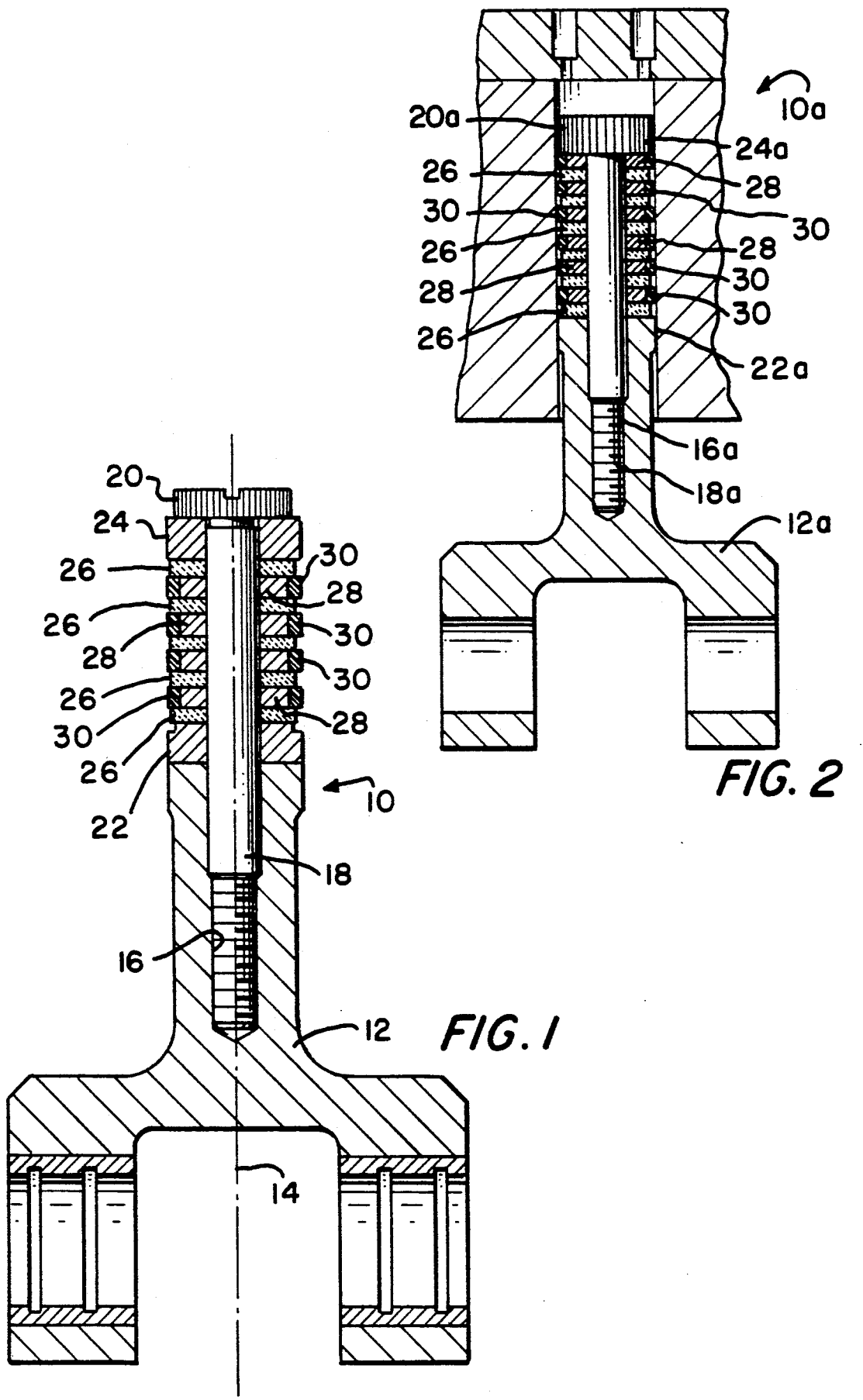

PISTON ASSEMBLY WITH WEAR RESISTANT PISTON RING LANDS

This is a continuation of Ser. No. 519,536 filed May 4, 1990, abandoned.

This invention pertains to reciprocating-component machinery, such as reciprocating engines, pumps, and gas compressors, and in particular to a novel piston assembly for reciprocation within a cylinder.

Reciprocating, ringed pistons are susceptible to high wear rates, notably in the piston ring lands or carriers. This arises due to the piston ring movement, and spinning action during compression strokes.

It is an object of this invention to set forth a novel piston assembly which provides wear-resistant piston ring seating surfaces.

Particularly, it is an object of this invention to set forth a piston assembly for reciprocation within a cylinder, comprising a piston body having a longitudinal axis; separate piston-ring lands, and separate spacers, interlayered on said body; and means coupled to said body (a) for holding said lands and spacers in position on said body, and (b) for guidance of said body in reciprocation, within a cylinder, along said axis; wherein said body-guidance means has one greatest diameter; said lands have one, common diameter which is less than said greatest diameter; and said lands are formed of a nonmetallic mineral.

It is also an object of this invention to disclose a piston assembly for reciprocation within a cylinder, comprising a piston body having a reciprocation axis; piston-ring lands coupled to said body; and means coupled to said body for (a) guiding said body in reciprocation within an enclosing cylinder, and (b) spacing said lands from confronting surfaces of such an enclosing cylinder., wherein said lands are formed of a nonmetallic mineral.

Further objects of this invention as well as the novel features thereof, will become more apparent by reference to the following description, taken in conjunction with the accompanying figures, in which:

FIG. 1 is an axial, cross-sectional view of a preferred embodiment of the invention; and FIG. 2 is a view like that of FIG. 1, albeit of an alternative embodiment of the invention.

As shown in FIG. 1, the novel piston assembly 10 comprises a piston body 12 having a longitudinal, reciprocating axis 14. The body 12 has an axial, threaded bore 16 formed therein which receives the threaded shank 18 of a headed bolt 20. Set against an uppermost, annular end of the body 12 is an apertured, lower rider ring 22. Underlying the head of the bolt 20 is an apertured, upper rider ring 24. Stacked between the rider rings 22 and 24, in interlayered fashion, are separate piston-ring lands 26 and separate piston spacers 28. Between pairs of adjacent lands 26, one spacer 28 is interposed.

The rider rings 22 and 24, together with the bolt 20, comprise means for guiding the piston body 12 in its reciprocation within a cylinder (not shown), and for spacing the lands 26 from confronting surfaces of such a cylinder. The rider rings 22 and 24 have a greatest diameter which causes them to effect a slidable interface with such confronting surfaces of a cylinder, and piston rings 30, which are set within adjacent lands 26, and about the spacers 28, sealingly close onto the cylinder wall. The lands 26, however, have a common diameter which is smaller than that of the rings 22 and 24. Consequently they do not contact the cylinder surface. To present a significantly wear-resistant surface to the piston rings 30, the lands 26 are formed of ceramic material.

The lands 26, therefore, comprise means (a) defining seating surfaces for the piston rings 30, (b) for confining the piston rings therebetween, and (c) resistant to wear of the seating surfaces, which normally would be occasioned by the piston rings, seated upon the surfaces and between the lands 26, due to the spinning movement of the rings 30.

An alternative embodiment of the inventive piston assembly 10a is similar in most respects to the embodiment 10 of FIG. 1. This second embodiment 10a, however, dispenses with the separate rider rings. Rather, the piston body 12a has an uppermost, annular end which is radially expanded to define, thereat, a first guiding surface 22a. Body 12a is also axially bored and threaded at 16a to receive the threaded shank 18a of a headed bolt 20a. The head of the bolt defines a second, reciprocation guiding surface 24a. Again, stacked between the bolt head and the uppermost, annular end of the body 12a are interlayered lands 26, of ceramic material, and piston spacers 28, arranged to receive the piston rings 30 between the ceramic lands 26. In this embodiment also, the diameter of the ceramic lands 26 is slightly less than the diameter of surfaces 22a and 24a.

While I have described my invention in connection with specific embodiments thereof, it is to be clearly understood that this is done only by way of example, and not as a limitation to the scope of my invention as set forth in the objects thereof and in the appended claims. For example, given numbers of spacers 28 and lands 26 are depicted, but the numbers of each are not limiting. Too, in each of the embodiments, headed bolts are employed; this is arbitrary, as the threaded bores 16 (and 16a) could receive a threaded stud which, in turn, would receive a topmost, threaded nut for closure onto the stack of lands 26 and spacers 28. These, and all such modifications and or alterations of my disclosure are deemed to be within the ambit of my invention and embraced by the following claims.

I claim:

1. A piston assembly for reciprocation within a cylinder, comprising:
   a piston body having a longitudinal axis;
   separate piston-ring lands, and separate spacers, interlayered along a length of said body; and
   means coupled to said body (a) for holding said lands and spacers in position on said body, and (b) for guidance of said body in reciprocation within a cylinder, along said axis; wherein
   said body-guidance means has one greatest diameter;
   said lands have one, common, outside diameter which is less than said greatest diameter; and
   said lands are formed of a nonmetallic mineral, and comprise means (a) defining seating surfaces for piston rings, (b) for confining piston rings therebetween, and (c) resistant to wear of said seating surfaces, which normally would be occasioned by such piston rings, seated upon said surfaces and between said lands, due to spinning movement of such piston rings.

2. A piston assembly for reciprocation within a cylinder, comprising:
   a piston body having a reciprocation axis;

piston-ring lands coupled to, and arranged lengthwise of said body; and means coupled to said body for (a) guiding said body in reciprocation within an enclosing cylinder, and (b) spacing said lands from confronting surfaces of such an enclosing cylinder; wherein said lands are formed of a nonmetallic mineral, and comprise means (a) defining seating surfaces for piston rings, (b) for confining piston rings therebetween, and (c) resistant to wear of said seating surfaces, which normally would be occasioned by such piston rings, seated upon said surfaces and between said lands, due to spinning movement of such piston rings.

3. A piston assembly, according to claim 2, wherein:
said guiding and spacing means comprises means for effecting a slidable interface with such confronting surfaces of an enclosing cylinder.

4. A piston assembly, according to claim 2, wherein:
said body is axially bored; and
said guiding and spacing means comprises a headed bolt; wherein
the shank of said bolt is set in said bore, and the head of said bolt comprises means for effecting a slidable interface with such confronting surfaces of such an enclosing cylinder.

5. A piston assembly, according to claim 4, wherein:
said axial bore in said body is threaded;
said lands are centrally apertured;
said shank of said bolt penetrates said lands and threadedly engages said axial bore to secure said lands to said body.

6. A piston assembly, according to claim 2, wherein:
pairs of adjacent lands are spaced apart, axially, by intervening spacers.

7. A piston assembly, according to claim 2, wherein:
said guiding and spacing means comprises (a) a headed bolt, and (b) a centrally-apertured rider ring.

8. A piston assembly, according to claim 7, wherein:
said body has an axially-extending, threaded bore formed therein; and
the shank of said bolt penetrates said rider ring and threadedly engages said threaded bore.

9. A piston assembly, according to claim 2, wherein:
said guiding and spacing means comprises (a) a headed bolt, and (b) a pair of centrally apertured, and axially spaced apart rider rings.

10. A piston assembly, according to claim 9, wherein:
said body has an axially-extending, threaded bore formed therein;
said lands are centrally apertured, and interposed between said rider rings;
the shank of said bolt penetrates said rings and lands, and threadedly engages said axial bore to secure said rings and lands to said body.

* * * * *